United States

Little

[11] 3,884,706

[45] May 20, 1975

[54] ALGICIDAL ROOFING GRANULES

[75] Inventor: David C. Little, Hagerstown, Md.

[73] Assignee: GAF Corporation, New York, N.Y.

[22] Filed: Oct. 25, 1972

[21] Appl. No.: 300,854

[52] U.S. Cl........ 106/15 R; 106/15 AF; 106/308 B; 71/67
[51] Int. Cl............................................. C04b 41/06
[58] Field of Search .......... 117/100 D, 27, 70 S, 32, 117/169 R; 106/15 AF

[56] References Cited
UNITED STATES PATENTS

| | | | |
|---|---|---|---|
| 3,476,577 | 11/1969 | Davie | 106/15 AF X |
| 3,494,727 | 2/1970 | Rapaport | 106/15 AF X |
| 3,507,676 | 4/1970 | McMahon | 117/25 X |
| 3,528,842 | 9/1970 | Skadulis | 117/100 S X |

FOREIGN PATENTS OR APPLICATIONS

| | | | |
|---|---|---|---|
| 491,238 | 3/1953 | Canada | 106/15 AF |
| 705,367 | 3/1965 | Canada | 117/27 |

OTHER PUBLICATIONS

Chem. Abstracts Vol. 51 Col. 4837 section (f) Walter Url.

Primary Examiner—William D. Martin
Assistant Examiner—Dennis C. Konopacki
Attorney, Agent, or Firm—W. C. Kehm; S. B. Leavitt; J. J. Ward

[57] ABSTRACT

The presence of both copper and zinc algicides in a moisture permeable, substantially water insoluble silicate-clay coating on base mineral roofing granules is found to enhance the resistance of roofing surfaces containing such granules to discoloration due to the growth of algae and/or fungi during extended periods of exposure to atmospheric weathering. During periods of rain and dew, zinc and copper ions are slowly leached from the granule coating, with the presence of both zinc and copper ions producing a bimetallic toxic effect that is particularly effective in retarding the biological growth of said algae and/or fungi. Relatively small amounts of said zinc and copper algicides can be employed, e.g. from about 0.5 to about 0.5 percent by weight of each said algicide, based on the total weight of base mineral granules. The zinc algicide is thus employed at a level at which such a zinc algicide alone has been found ineffective, but that, together with the copper algicide, produces a toxic effect superior to that obtained by incorporation of the copper algicide alone in the granule coating at an equivalent dosage.

12 Claims, No Drawings

ALGICIDAL ROOFING GRANULES

BACKGROUND OF THE INVENTION

1. Field of the Invention

This invention relates to algicidal roofing granules. More particularly, it relates to algicidal roofing granules having an enhanced ability to retard the growth of algae and/or fungi over extended periods of time.

2. Description of the Prior Art

Roofing granules, both natural and artificially color-coated granules, are extensively used in roll roofing and asphalt shingle compositions. The roofing granules are generally embedded in the asphalt coating on the surface of an asphalt-impregnated salt base material, the granules thus forming a coating that provides an adherent, weather-resistant exterior roofing surface. As this outer granule coating also provides the esthetic effect observable with respect to the roofing composition, the appearance of the granules is of major marketing interest. For this reason, therefore, a pigmented color coat is ordinarily applied to the base mineral granules to enhance their visual, decorative effect.

As white or light-colored roofs are particularly favored in warmer climates, $TiO_2$ pigment is commonly used in the production of light color-coated roofing granules. In such warmer climates, as in the southern part of the United States, discoloration of asphalt roofing compositions by the growth of algae and/or fungi is of particular concern. Such discoloration, of course, is particularly noticeable on the white or light-colored roofs otherwise so desired and popular in such regions. Upon discoloration, the roof becomes unsightly in appearance and is found to cause a greater heat absorbence as, for example, when a white roof is turned dark brown or black in a period of a few years in use.

Nor is this problem, so widespread in areas such as the southern United States, particularly the gulf state area, confined necessarily to such regions. Thus, discoloration of roofing surfaces by the growth of algae and/or fungi has also been found in the northern part of the United States, particularly so in areas along rivers and lakes and along the northern coastal regions. While home owners and others have been aware of this discoloration problem for many years, effective, practical solutions thereto have not been forthcoming at a reasonable cost. The problem of roofing granule discoloration, therefore, has remained a major marketing problem for the roofing industry.

For many years, this problem of roofing granule discoloration was believed to be caused only by fungi, as is the case with respect to some outdoor paint surfaces. Many different types of fungi have, in fact, been isolated from discoloration roofing surfaces. More recently, however, it has been learned that other organisms contribute principally to this discoloration and have been identified as terrestrial blue-green algae of the Cyanophyta division. Such algae as transferred through the air as spores and/or vegetative matter and deposited on roofing surfaces where they thrive and grow. Natural pigments produced by the algae add to the dark discoloration of the roof, which is generally first noticeable in spots that develop into dark vertical streaks that gradually darken until the entire roof becomes a totally discolored black within five to 15 years. Predominant algae thus identified from infested roofing shingles include *Gloeocapsa Magma*, *Tolypothrix Byssoidea*, *Nostoc sp.* and *Scytonema sp.* In general, metallic algicides that are effective in retarding the biological growth of such algae are likewise effective in similarly retarding the growth of fungi. The incorporation of a metallic algicide in the color coat of roofing granules, therefore, has heretofore been proposed in order to inhibit or prevent the discoloration of roofing surfaces containing such granules as a result of algae and/or fungi growth.

The incorporation of a metallic copper algicide in the color coat of roofing granules was disclosed in the Skadulis patent, U.S. Pat. No. 3,528,842. Skadulis particularly proposes the incorporation of copper algicides that are substantially water-insoluble but that have limited solubility in acidic solutions, e.g. $Cu_2O$. Highly water-soluble copper algicides, such as $CuSO_4$, were indicated as being effective for this application since it was suggested that such algicides would be leached out of the color coat very rapidly, i.e. within a few months, so that the resistance to algae growth and roofing discoloration would not be effective over any reasonable length of time. Skadulis also indicated that virtually water-soluble compounds, such as $CuO$, would not be effective because, it was suggested, of insufficient solubility thereof in rainwater and dew (Column 2, lines 24-44). Similarly, slightly soluble zinc algicides were disclosed for incorporation in the color coat of roofing granules in the McMahon patent, U.S. Pat. No. 3,507,676. As was pointed out in the McMahon patent in Column 2, lines 58-65, such zinc algicides are effective when employed in an amount constituting at least about 1 percent by weight of the base mineral granules, i.e. about 20 lbs. of the zinc algicide compound or metal per ton of granules.

The incorporation of particular copper or zinc algicides in the color coat of roofing granules, in the manner and in the quantities taught by the Skadulis and McMahon patents, imparts a desirable resistance of roofing surfaces containing such granules to discoloration upon exposure to atmospheric weathering. The teachings of these patents, however, have not led to the development, commercial availability and use of algicidal roofing granules providing the desired degree of algae and/or fungi resistance over an extended period of time at economically competitive cost. In part, of course, this unavailability of a totally satisfactory algicidal roofing granule reflects the continual desire in the roofing industry for a more effective algicidal effect from a roofing granule of ever diminishing incremental cost to achieve such an algicidal effect. While the prior art techniques have thus imparted an algicidal effect to roofing granules, an enhanced algicidal effect would provide a further assurance of the desired toxic effect of the granules in retarding biological growth of algae and/or fungi, thereby enhancing the quality of the roofing surfaces containing such granules. In addition, a more effective algicidal granule may also tend to enhance the period of time over which the algicidal roofing granules provide resistance of the roofing surfaces incorporating same to discoloration upon atmospheric weathering in use. This also enhances the quality of the roofing material, and of the algicidal granules therein, particularly for marketing and use in humid environments conducive to the growth of such algae and/or fungi.

Any incorporation of metallic algicides in an otherwise conventional roofing granule coating in order to achieve the necessary or desirable algicidal effect necessarily adds an incremental cost to the roofing granule and to the roofing material incorporating such an algicidal granule. While the desired toxic effect is a necessary or highly desirable feature of the algicidal roofing granule, the providing of this property or function is an expense item that, from a marketing viewpoint, must be minimized to the fullest possible extent. The use of minimum quantities of metallic algicides to produce a desired level of effectiveness over an extended period of time is, therefore, highly desirable. In this regard, it should be noted that the algicidal granules of McMahon require the incorporation of a relatively large amount of zinc for effective algicidal action as noted above. As the amount of metallic algicide required for effective action increases, the cost of the resulting algicidal granule is directly increased thereby. In addition, the use of relatively large amounts of metallic algicides frequently requires the incorporation of pigment in the granule coating in amounts in excess of that otherwise required to achieve a desired roofing granule color. As the amount of $Cu_2O$ employed is increased, for example, the amount of $TiO_2$ pigment that must be employed in the granule coating composition to produce a white roofing granule is also generally increased. Such an additional requirement necessarily adds to the overall cost of the algicidal roofing granule product and of roofing materials made therefrom. Furthermore, the requirements in accordance with the teachings of the prior art tend to limit or restrict the metallic algicidal materials that can be employed in a manner not necessarily consistent with the economic availability and feasibility of such materials in any particular application. Optimum flexibility as to the metallic algicides employed is, therefore, another desirable aspect in the providing of roofing granules having algicidal properties.

It is an object of the present invention, therefore, to provide improved aligicidal granules.

It is another object of the invention to provide algicidal granules having an enhanced ability to retard the biological growth of algae and/or fungi.

It is another object of the invention to provide algicidal roofing granules having effective algicidal properties at economical levels of metallic algicide content.

It is another object of the invention to provide algicidal roofing granules having enhanced flexibility as to the metallic algicides employable therein.

It is a further object of the invention to provide roofing surfaces having an enhanced resistance to discoloration during extended periods of exposure to atmospheric weathering.

It is a further object of the invention to provide roofing sufaces incorporating algicidal roofing granules having an enhanced toxic effect in retarding biological growth of algae and/or fungi.

With these and other objects in mind, the invention is hereinafter set forth in detail, the novel features thereof being particularly pointed out in the appended claims.

SUMMARY OF THE INVENTION

An enhanced effect in retarding the biological growth of algae and/or fungi is achieved by incorporating both copper and zinc algicides in the color coating of base mineral roofing granules. During periods of rain and dew, both copper and zinc ions are leached from said coating, producing a bimetallic toxic effect that is particularly effective in enhancing the resistance to discoloration of roofing materials incorporating such granules during atmospheric exposure for extended periods of time. Both the copper algicides and the zinc algicides can be employed effectively in relatively small amounts, generally from about 0.05 to about 0.5 percent by weight based on the total weight of base mineral granules. Algicides relatively soluble in water as well as those relatively insoluble can be employed, and particularly effective algicidal action is obtained by the use of a combination of such algicides. The copper algicide may thus comprise a mixture of cuprous and cupric algicides, e.g. a mixture of $Cu_2O$ and copper sulfate.

DETAILED DESCRIPTION OF THE INVENTION

In the practice of the present invention, roofing surfaces containing the novel algicidal granules of the invention release both zinc and copper ions slowly over an extended period of time during periods of rain and dew upon exposure to atmospheric weathering. The particularly effective toxic effect achieved in retarding the biological growth of algae and/or fungi is accomplished, at economically feasible algicidal content and overall granule cost, because of this leaching of both copper and zinc ions from the base granule color coating in such a manner as to enhance the resistance of the entire roofing surface to discoloration even in those mild humid environments that are normally conducive to the growth of such algae and/or fungi.

The enhanced algicidal effect obtained by the present invention has been found to pertain in the use of copper and zinc algicides that are either slightly soluble or very soluble in water. As will be hereinafter disclosed in further detail, it is often advantageous to employ a combination of such algicides to assure an initial release or leaching of sufficient algicidal ions to assure against the early development of algae and/or fungi upon exposure of the roofing surface, while also assuring a supply of algicidal ions for subsequent release over an extended period of time to extend the desired resistance to discoloration over a commercially satisfactory, extended period of time. In this regard, the effective algicidal control provided by the present invention is not believed related essentially to the solubility of the metallic algicides employed per se, but to the ionization mechanism that permits the formation of algicidally effective copper and zinc ions that are consequently released or leached from the color coating during periods of rain or dew. It is nevertheless to be noted that a highly water soluble metallic algicide, such as copper sulfate, will dissolve and leach copper ions at a more rapid rate under some conditions encountered from time to time upon atmospheric weathering of the roofing surfaces containing the novel granules of the present invention. Thus, in periods of heavy rain for prolonged periods of time, the more highly soluble copper sulfate algicide in the granule color coating will release a greater number of copper ions than will be released form a $Cu_2O$ algicide present in equivalent quantities and subject to the same atmospheric weathering conditions. It has been found, however, that such relatively greater release of copper ions from copper sulfate during such conditions, contrary to being as disadvantageous as would be expected from the prior art teachings, actually serves to contribute to the effective algicidal control over the entire roofing surface. What is referred to herein as a "wash-out" effect, therefore, has been found desirable in the practice of the present invention provided, of course, that a sufficient reservoir of releasable algicidal ions are present to provide the desired toxic effect over an extended period of time. With respect to metallic algicides having a known relatively low solubility in water, it should also be noted that such algicides, such as cuprous oxide for example, have a somewhat greater solubility under acid conditions than under either alkaline or neutral conditions. The color coated roofing granules of the invention are initially slightly alkaline. After a period of weathering, however, this alkalinity is reduced, and the surface of the roofing granules may become slightly acidic due to the effects of acids resulting from degradation of the asphaltic portion of the roofing material and from various atmospheric sources that contact the roofing surface. A variety of factors, therefore, are pertinent to the effective resistance of roofing surface containing the algicidal granules of the present invention to discoloration during extended use. While the solubility of the particular algicides incorporated into the color coating of the roofing granules is one significant aspect of the algicidal control operation, the fundamental and essential feature is the ionization by whatever means of both the copper algicide and the zinc algicide content of the color coating so that the bimetallic toxic effect obtained by the leaching of both zinc and copper ions is achieved to effectively retard the biological growth of algae and/or fungi. A variety of metallic algicidal components providing for the release, at varying rates, of the desired copper and zinc ions can thus be employed successfully in the practice of the present invention to provide high quality roofing surfaces having highly desirable algicidal properties such as to resist the unsightly and highly undesirable discoloration resulting from the biological growth of algae and/or fungi. This flexibility inherent in the practice of the present invention is, of itself, a significant advantage to the roofing industry in providing roofing granules and roofing materials containing such granules having an effective ability to retard or prevent the undesired biological growth of algae and/or fungi.

The copper and zinc algicides employed in the novel roofing granules of the present invention may be any of the available copper and zinc compounds generally known as possessing algicidal properties and that would, when applied in the roofing granules of the invention, release either copper or zinc ions slowly during periods of rain and dew. It is this release of algicidal ions and the leaching thereof over the roofing surface that produces the desired effect of retarding biological growth of algae and/or fungi on the roofing surface. The point of novelty of the present invention, of course, is in the highly effective bimetallic toxic effect resulting from the release of both copper and zinc ions and the resulting favorable balance between algicidal properties, economical production and overall flexibility achieved in accordance with the teachings of the present invention. As suggested above, a wide variety of known copper algicidal compounds can be employed in the practice of the present invention. Illustrative of this wide range of suitable copper compounds is, on the one hand, $CuSO_4$, not heretofore deemed advisable for use in algicidal granules because of its relatively high water solubility, and, on the other hand, compounds such as CuO, not heretofore deemed suitable because of a very low water solubility. Those copper compounds heretofore deemed suitable for use in algicidal granules because of a limited water solubility, particularly under the acidic conditions normally encountered in roofing applications, are also suitable copper algicidal compounds for use in the present invention. $Cu_2O$ and $Cu_2Br_2$ are illustrative examples of such copper algicidal compounds. As indicated above, the solubility per se of the algicidal compounds employed is not deemed decisive. The release from the granule color coating of effective ions that are slowly leached over the roofing surface under the conditions encountered during atmospheric weathering so as to produce the desired toxic effect in retarding biological growth of algae and/or fungi is at the essence of the present invention, regardless of the relative water solubility of the copper and zinc compounds employed under conditions unrelated to those encountered in the atmospheric weathering of roofing surfaces.

The algicidal compounds used herein slowly release toxic ions that inhibit or prevent unsightly discoloration of roofing surfaces due to biological growth. As indicated above, such discoloration is now believed to be caused principally by various algae, although fungi spores are also found to exist on roofing surfaces susceptible to biological growth. As a result, some confusion or imprecision has persisted in general discussions of roofing discoloration, with such discoloration sometimes being casually referred to as fungi discoloration even though the biological growth of algae may actually be the major contributing factor therein. For this reason, therefore, the present invention is disclosed and claimed herein with respect to the inhibition or retardation of the biological growth of "algae and/or fungi." It will be understood that the slow release of toxic ions from the algicidal roofing granules of the invention is effective, in any event, in inhibiting or preventing the unsightly discoloration of roofing surfaces due to biological growth regardless of the general characterization of such undesired growth as algae growth or fungi growth in ordinary consideration of roofing performance with respect to resistance to discoloration due to biological growth. Suitable compounds having the desired algicidal properties will, in any event, generally be suitable also for fungi control purposes. In this regard, it should be noted that, although phosphates are known nutrients for fungi, copper phosphate can be used in the present invention for effective action, at the dosage levels indicated, in preventing discoloration due to biological growth of algae and/or fungi. Illustrative of other copper materials that can be employed are copper chloride and copper metal beads.

The zinc algicide employed in the practice of the present invention will, of course, also be any suitable zinc-containing material that effectively releases zinc ions upon atmospheric weathering under conditions of rain or dew so that such zinc ions are leached from the color coating of the granule for effective action over the entire roofing surface containing such granules. The most generally preferred zinc algicide from an overall commercial viewpoint is zinc oxide. Other zinc-containing compositions such as ZnS and metallic oxide pellets or particles can also be employed in the practice of the present invention.

The zinc and copper algicides incorporated in the color coating of the subject roofing granules are each employed in relatively small amounts ranging from about 0.05 to about 0.5 percent by weight based on the total weight of the base mineral granules. More particularly, the zinc and copper algicidal materials can both be generally employed to advantage in amounts within the range of from about 0.1 to about 0.4 percent by weight based on the total weight of said base mineral granules. With respect to the zinc algicide employed, an amount within the range of from about 0.15 to about 0.25 percent by weight of said zinc algicide based on the weight of base granules has been found useful and convenient in particular applications of the invention. A copper algicidal content generally in the range of from about 0.25 to about 0.35 percent by weight of base granules has similarly been found especially advantageous in many practical applications of the invention.

As in the preparation of conventional roofing granules, the algicidal roofing granules of the present invention are prepared using any suitable base raw mineral granules, such as greenstone or netheline syenite. In the conventional production of artificially colored roofing granules, an alkali metal silicate-clay coating is applied to the base mineral granules and fired to produce a moisture permeable, substantially water insoluble, durable, pigmented coating on the base mineral granules. Two general methods are commonly employed for color coating such base mineral granules, both of which can be employed in the practice of the present invention. In one method, referred to as the continuous paint slurry process, crushed and screen graded mineral granules are constantly mixed with a paint slurry containing pigments, clay and sodium silicate in suitable mixing equipment. The thus color coated granules are then heated to a temperature that may range from about 600° to about 1200°F in a rotary-type kiln. Dehydration of the silicate occurs, and an extremely hard color-coated granule is obtained. In the event that the granules are fired at lower temperatures, e.g. about 500°F, the silicate-clay coating may require treatment by the addition of a pickling agent, such as $AlCl_3$ solution, in order to properly insolubilize the coating. Upon cooling, the color coated granules are generally post treated with suitable processing oils and/or coating compositions as is known in the art.

In a second, batch-type process, essentially the same coating, firing and post treatment operations are performed except that a weighed amount of crushed and screen graded base mineral granules is mixed with a weighed amount of pigments and clay, and the silicate is added to this premix in a suitable mixer, commonly a tumbling barrel-type mixer. The firing and post treatment of the color coated granules are as referred to above with respect to the continuous process.

In the practice of the present invention, the desired algicidal properties are imparted to the color coated roofing granules by incorporating the indicated combination of copper and zinc algicides into the paint formulation in the otherwise conventional color coating of the base mineral granules in accordance with the industry accepted techniques referred to above or any other suitable granule coating technique. It will be appreciated that it is within the scope of the invention to apply more than one such coating on the granules and, in accordance therewith, the algicidal compounds of the invention may be incorporated in either one or both of such color coatings. In the event the subject algicidal compounds are incorporated in more than one such color coating, the overall amounts of copper algicide and zinc algicide employed in the overall granule coatings are nevertheless within the amounts heretofore disclosed with reference to a single coating.

The asphaltic roofing compositions in which the novel algicidal roofing granules of the present invention are incorporated are roofing shingles, rolled roofing, and the like, having an organic asphalt-saturated felt base that is coated with an asphalt of a higher softening point and surfaced with base mineral granules having the color coating hereinabove indicated with the combination of copper and zinc algicides incorporated therein. The felt layer is customarily composed of wood fibers, either along or in combination with paper pulp, repulped paper and/or rags, asbestos fibers, or the like. Such felts are generally referred to in the industry as roofing felts. The saturants most commonly employed to saturate the felt layer include residual oil, soft residual asphalt and soft blown petroleum asphalt, and mixtures thereof. Preferred saturants generally have a ring and ball softening point of approximately 120° to 130°F and a penetration of approximately 60 at 77°F.

This saturated felt layer is then coated with an asphalt of a higher softening point and lower penetration than that of the saturant. Preferred materials will generally have a ring and ball softening point of approximately 175° to 260°F and a penetration of approximately 10 to 50 at 77°F. Coating asphalts of this type include native and sludge asphalts, fatty acid pitches and the like. In accordance with customary practices in the art, this asphalt coating layer is commonly embedded with powdered silica (sand), limestone, slate dust, clay, etc., and mixtures thereof. The color coated roofing granules of the invention are applied to the asphalt layer surface, and the resulting roofing surface is then passed through suitable rollers and presses, quenched and otherwise treated and handled in accordance with conventional practice in the roofing industry. It will be appreciated that numerous variations in the production of the desired roofing compositions and in the additive materials employed are well known in the art and can be employed within the scope of the present invention.

As indicated above, the copper algicide and zinc algicide portions of the novel compositions of the present invention may include a combination or mixtures or either or both of said copper and zinc algicides. It has been found advantageous, for example, to incorporate a mixture of cuprous and cupric algicides in the novel roofing granules of the invention. The cuprous content of the copper algicidal portion of the granule may conveniently comprise from about 25 to about 75 percent by weight of such copper portion in this embodiment of the present invention. A particularly desirable mixture or combination of copper algicides is $Cu_2O$ and copper sulfate, conveniently employed in combination with ZnO as the zinc algicide portion of the algicidal content of the granule color coating. It has been found that such combinations are particularly effective in retarding algae and fungi over extended periods of time with a tolerable incremental cost over that of conventional color coated, non-algicidal roofing granules. It is believed that copper ions leached from the copper sulfate composition is perhaps a predominant proportion during the initial periods of exposure to atmospheric weathering in the early years of surface of roofing materials incorporating same greatly inhibits or prevents the early infestation of algae and fungi on the roof so as to enhance the resistance of the roofing surface to discoloration. The wash-off effect of algicidal copper ions from the copper sulfate content of the roofing granule coating is believed to enhance this desirable resistance by assuring that the desired toxic effect is operative over the entire roofing surface. In addition to this early toxic effect, of course, the highly effective bimetallic toxic effect of both copper and zinc ions is operable to enhance the effectiveness of the algicidal action. As the years of service of the novel roofing composition of the invention progress, the algicidal copper ions in this embodiment will be derived to a greater extent from the $Cu_2O$ content of the copper algicide portion of the color coating.

The fired color coating on the novel granules of the invention is hard and durable and substantially water insoluble so as to adequately resist the effects of atmospheric weathering. The coating is nevertheless moisture permeable so as to permit passage of moisture therein during periods of rain and dew. As previously indicated, the granule surfaces exposed to atmospheric weathering is somewhat acidic so that the moisture present on the surface of the interstices of the granule will also generally be acidic. Upon contact of the moisture with the algicidal content of the permeable color coating of the granule, both copper and zinc ions are released therefrom and are slowly leached over the surface of the roof, providing the desired algicidal protection.

In comparative algicidal control experiments to illustrate the beneficial effects of the present invention, field testing of sample asphaltic roofing panels having metallic algicides included in the color coating thereof was carried out in the United States and elsewhere under conditions highly conductive to rapid algae development. Experimental and control granules exposed under such algae conducive conditions were evaluated periodically to observe comparative effects that can be reasonably related to known performance of conventional roofing granules in ordinary roofing usage under generally applicable weathering conditions. Meaningful comparative results were observable within periods of time ranging from 6 months to 2 years for some test locations up to about 3–4 years in others. Experimental algicidal roofing granules, including the novel granules of the present invention, were compared with one another and with untreated control granules exposed for the same period of time under the same set of conditions. In these comparative experimental runs, ordinary base mineral granules were coated with color coating paint slurries that were maintained uniform in composition except for variations in the nature and amount of metallic algicides incorporated therein. The coatings thus contained conventional amounts of sodium silicate, clay and water, together with $TiO_2$ pigment to produce a white roofing granule. While the precise coating composition is not an essential feature of the invention and is of conventional nature, one such suitable paint slurry contains, for example, sodium silicate, clay, water and $TiO_2$ in respective proportions constituting 50, 40, 55 and 20 lbs. per ton of base mineral granules with which the paint slurry is mixed. A convenient granule firing temperature to insolubilize the coating was employed and maintained uniform throughout. It will be appreciated that the particular firing temperature employed is not an essential feature of the invention and care was taken in any event to assure that such non-inventive aspects of the testing program were held constant in any particular series of tests so that meaningful comparative results could be obtained. Conventional post treatment of the fired granules with processing oil was likewise performed on a uniform basis.

The comparative laboratory testing and field evaluations carried out serve to establish the highly desirable features of the novel algicidal roofing granules of the invention and of roofing surfaces incorporating such granules. The exposure of test panels in which a zinc algicide, namely ZnO, was employed as the sole algicidal compound established, in evaluations extending over several years, that zinc algicide contents of at least about 1 percent by weight, based on the weight of base mineral granules, was required for effective algicidal control. This confirmed the disclosure of the McMahon patent, U.S. Pat. No. 3,507,676, referred to above. Thus, about 25 lbs. of ZnO were required in the color coating for effective inhibition of algae growth. At 10 lbs. of ZnO per ton of base granules, on the other hand, the roofing granules were found to have completely failed to inhibit algae growth, producing results that were totally unacceptable for commercial application as algicidal roofing granules.

In another series of field evaluations using $Cu_2O$ as the sole algicidal ingredient of the granule color coating, moderate algae infestation and growth was observed after little more than one year at $Cu_2O$ contents of from 3 to 6 lbs. per ton of base mineral granules. At higher $Cu_2O$ rates, i.e. at 10 lbs. of $Cu_2O$ per ton of granules, algae infestation and growth were discernibly reduced in evaluations over the same period of time and under the same humid conditions conducive to algae growth. Nevertheless, even at such $Cu_2O$ levels, the results were reported by experienced observers as from slight up to the moderate algae growth encountered at lower levels. While all of these results represented an advantage in algae control over untreated or non-algicidal, color coated granules, it will be appreciated that an overall commercial evaluation as to the benefits achieved necessarily must take into account the degree of algae control, the significance of such control in terms of the ordinary life of the roofing surface, the esthetic effect of even moderate algae growth, particularly on white roofs, including the subjective marketing effect on the homeowner and home builders, all in light of the necessary incremental increase in the price of roofing material to achieve some improvement in algae control.

For comparative evaluation purposes, 10 lb. of algicidal compounds in accordance with the teachings of the present invention were included in the granule color coating employed in other test panels likewise exposed to the humid environments used in the previously mentioned evaluations. In this series of field tests, $Cu_2O$, copper sulfate and ZnO were included in the granule color coating in the respective amounts of 2 lbs., 4 lbs. and 4 lbs. per ton of base mineral granules respectively. Algae growth over equivalent time periods was found to be appreciably reduced to amounts evaluated by experienced observers as ranging from slight to non-traceable amounts. Upon experienced evaluation of the test results under the humid conditions conducive to algae growth deliberately selected to facilitate the obtaining of meaningful comparative samples, it can be concluded that the algicidal roofing granules achieve a significant effect, enhancing the toxic effect of the algicidal ions in retarding the growth of algae, when prepared in accordance with the teachings of the present invention.

It should be noted that the highly desirable field results were obtained by the addition of ZnO to the $Cu_2O$ in an amount heretofore confirmed and known in the art as being totally ineffective for algae control. In addition, the total overall amount of copper and zinc algicides employed was at the minimum level required by use of $Cu_2O$ alone to achieve a significant algae inhibiting effect. At such equivalent levels, the bimetallic toxic effect of the copper and zinc ions leached from the roofing granules of the present invention produced a significantly enhanced result over that obtained by $Cu_2O$ alone.

The field evaluations of the roofing granules of the present invention referred to above were carried out at an overall algicidal level of 0.5 percent by weight based on the weight of base mineral granules, with 0.2 percent ZnO and 0.3 percent of the combination of $Cu_2O$ and copper sulfate being employed. Such algicidal content levels are economically feasible when accompanied by the significant algicidal control achieved when such roofing granules are employed in otherwise conventional roofing surfaces exposed to atmospheric weathering under conditions conducive to the growth of algae and/or fungi. In this regard, it should be noted that the level of $Cu_2O$ addition alone, namely 0.5 percent, was not in itself economically unacceptable, but was accompanied by algicidal control results not as significant as those achieved with the granules of the present invention and not deemed commercially acceptable for a high quality, premium priced algicidal roofing granule. In other test evaluations, it has been determined that the combination of copper and zinc algicides is effective when such algicides are employed over the previously indicated range of copper and zinc algicidal content, namely from about 0.05 to about 0.5 percent by weight of each algicide based on the weight of base mineral granules. While it will be understood that a balance between the desired algicidal control and the cost of the subject algicidal roofing granules in light of pertinent marketing considerations must be drawn, practical, commercially desirable algicidal roofing granules having copper and zinc contents within the general range are both technically effective and commercially attractive products. Copper and zinc algicidal contents less than those employed in the comparative tests referred to above have proven effective, the amount of each algicide and the total algicidal content of the granule color coating thus being considerably less than that required in the algicidal granules heretofore known in the art in which either a copper algicide or a zinc algicide is employed at higher content levels with less effectiveness than is achieved in the practice of the present invention.

Contrary to the established teaching in the art, the presence of copper sulfate in the algicidal roofing granules of the present invention has not been found unacceptable, but is believed actually to contribute to an overall improvement in the resistance of roofing materials to algae discoloration. The so-called wash-off effect of copper ions from the copper sulfate portion of the algicidal content is believed to provide an early assurance of full algicidal protection to the roofing surface in such a manner as to effectively inhibit algae infestation and subsequent discoloration problems over the extended period of service of the roofing material. The reservoir of copper and zinc ions nevertheless provided in preferred embodiments of the invention serve to implement this algicidal control over such extended periods of time, assuring that the problems of unsightly roofing discoloration are minimized over the ordinary life of the roofing surface in typical applications thereof. The presence of such copper sulfate, however, is not essential to achieve an enhanced algae inhibition result, the bimetallic toxic effect of a combination of copper and zinc ions from any suitable source of zinc and copper algicides is effective in producing a significant improvement in algicidal control at an economically acceptable cost. In addition, the flexibility as to the nature of the zinc and copper algicides employed in the practice of the present invention, deviating from the restrictions thereof heretofore believed applicable in the art, further enhances the commercial acceptability and significance of the present invention. As the incremental $TiO_2$ or other pigment content of the color coating to offset the color effect of the algicidal compounds is reduced as the amount of such algicidal compounds required for effective algae control is decreased, the present invention offers further economic and technical advantages in the providing of a practical and effective algicidal roofing granule. By melans of the present invention, therefore, a significant solution to the troublesome problem of algae discoloration is available to the roofing industry in a practical, realistic and economically feasible manner.

Therefore, I claim:

1. Algicidal roofing granules having an enhanced ability to inhibit or prevent the growth of discoloring algae and fungi organisms upon exposure of roofing surfaces containing such granules for extended periods of time, comprising base mineral granules coated with a moisture permeable, substantially water insoluble, durable, pigmented, fired, inorganic alkali metal silicate-clay coating containing zinc and copper algicides, said zinc algicide being present in an amount within the range of from about 0.05 to about 0.5 percent by weight based on the total weight of said granules, said copper algicide being present in an amount within the range of from about 0.05 to about 0.5 percent by weight based on the total weight of said base granules, said coating releasing zinc and copper ions slowly over an extended period of time during periods of rain and dew, whereby the zinc and copper ions released or leached during such periods of rain and dew produce a bimetallic toxic effect in retarding biological growth of algae and fungi, thus enhancing the resistance of roofing surfaces containing such granules to discoloration during extended periods of exposure to atmospheric weathering, particularly in humid environments conducive to the growth of such algae and fungi.

2. The granules of claim 1 in which said zinc and copper algicides are both present in an amount within the range of from about 0.1 to about 0.4 percent by weight based on the total weight of said base granules.

3. The granules of claim 2 in which the zinc algicide content of said coating is from about 0.15 to about 0.25 percent by weight of said base granules.

4. The granules of claim 3 in which said copper algicide content is from about 0.25 to about 0.35 percent by weight of said base granules.

5. The granules of claim 1 in which said copper algicide comprises a cupric algicide.

6. The granules of claim 1 in which said copper algicide comprises a cuprous algicide.

7. The granules of claim 1 in which said copper algicide comprises a mixture of cuprous and cupric algicides.

8. The granules of claim 7 in which the cuprous content of said mixture comprises from about 25 to about 75 percent by weight of said mixture.

9. The granules of claim 1 in which said copper algicide comprises $Cu_2O$.

10. The granules of claim 7 in which said cuprous algicide comprises $Cu_2O$ and said cupric algicide comprises copper sulfate.

11. The granules of claim 9 in which said zinc algicide comprises $ZnO$.

12. The granules of claim 10 in which said zinc algicide comprises $ZnO$.

* * * * *